United States Patent Office 2,861,089
Patented Nov. 18, 1958

2,861,089

PROCESS FOR THE PREPARATION OF 21-BROMO STEROIDS

William Graham, Greenford, England, assignor to Glaxo Laboratories Limited, Greenford, England, a British company No Drawing. Application June 7, 1957
Serial No. 664,170

Claims priority, application Great Britain August 3, 1954

8 Claims. (Cl. 260—397.45)

This invention is concerned with the preparation of steroid compounds, and more particularly with an improved method for the bromination in the 21-position of $3\beta:17\alpha$-dihydroxy-11:20-diketo derivatives of pregnane or allo-pregnane.

The preparation of 21-bromo-$3\beta:17\alpha$-dihydroxy-$5\alpha$-pregnane-11:20-dione by the bromination of $3\beta:17\alpha$-dihydroxy-$5\alpha$-pregnan-11:20-dione is described, in outline, by Chemerda, Chamberlin, Wilson and Tishler (J. A. C. S. 1951, 73, 4052) and by Rosenkranz, Pataki and Djerassi (ibid, p. 4055). A more detailed description incorporating the experimental details, is given by Pataki, Rosenkranz and Djerassi (J. A. C. S., 1952, 74, 5615), according to which an 0.3% solution in cholorform of $3\beta:17\alpha$-dihydroxy-$5\alpha$-pregnan-11:20-dione is treated with bromine in chloroform. After suitable washing with sodium bicarbonate solution and water the solvent is removed and the residue triturated with ether. The yield is 65% of the theoretical if the assumption is made that the product is 100% pure.

This assumption as to the purity of the brominated product is, however, untrue for if this latter product is treated with sodium iodide in acetone and then with potassium bicarbonate in acetic acid in order to give 21-acetoxy-$3\beta:17\alpha$-dihydroxy-$5\alpha$-pregnan-11:20-dione, M. P. 235–7° C., $[\alpha]_D^{20}$ +66° (acetone) it has been found that the material so obtained is not pure being a mixture of the desired acetoxy compound with unbrominated materials thus indicating that the brominated product consisted of the desired 21-bromo-$3\beta:17\alpha$-dihydroxy-$5\alpha$-pregnan-11:20-dione and unchanged starting material. In general brominations carried out in the manner described above lead to products that are mixtures, and it is thus desirable to employ a method which gives a consistent product with as high a proportion of the desired compound as possible. A further problem which arises is that the solubility of the starting material ($3\beta:17\alpha$-dihydroxy-11:20-diketo derivatives of pregnane and allopregnane) is so low in chloroform that in concentrations above 0.3% the bromination must be carried out with the starting material in suspension.

It has now been found that the bromination of the $3\beta:17\alpha$-dihydroxy-11:20-diketo derivatives of pregnane or allo-pregnane may be advantageously carried out by first forming a complex between the starting material and hydrogen bromide or hydrogen chloride in an inert, relatively non-polar organic solvent containing a small amount of a primary or secondary alcohol and then brominating this complex.

It has previously been proposed in U. S. Patent No. 2,684,375 to Oliveto to brominate keto-steroids, particularly 5$\beta$-dihydrocortisone acetate, in the presence of a strong mineral acid, such as hydrobromic acid and a solvent medium comprising a tertiary alcohol and an inert solvent such as chloroform or methylene chloride. The Oliveto process is directed to bromination in the nucleus and it is to be noted that it uses the tertiary alcohol and inert solvent in equal proportions.

If one attempts to apply the Oliveto process to the side-chain bromination of $3\beta:17\alpha$-dihydroxy-11:20-diketo derivatives of pregnane and allopregnane the reaction proceeds sluggishly in poor yields and non uniform products are obtained. The process according to the invention using small proportions of primary or secondary alcoholic proceeds however in good yield and substantially uniform products are obtained.

According to the present invention, therefore there is provided a process for the bromination in the 21-position of the $3\beta:17\alpha$-dihydroxy-11:20-diketo derivatives of pregnane and allo-pregnane consisting of reacting said diketo derivative with a hydrogen halide selected from the group consisting of hydrogen bromide and hydrogen chloride in the presence of a substantially non-polar organic solvent containing from 0.5 to 10% weight/volume (metric scale) of an alcohol selected from the group consisting of $C_1$–$C_8$ aliphatic primary alcohols and $C_1$–$C_8$ aliphatic secondary alcohols and brominating the resulting hydrogen halide complex.

Although the present process proceeds readily in good yield using secondary alcohols it is not, in general, so effective as when a primary alcohol is used and hence I prefer to use primary alcohols.

It is further preferred to carry out the process according to the invention on the said allo-pregnane derivative.

Suitable inert, substantially non-polar organic solvents for use in the present process are, for example, halogenated hydrocarbons, such as cholorform, methylene chloride, tetrachloroethane and carbon tetrachloride, and non-polar hydrocarbon solvents, such as benzene and petroleum. Of these solvents I prefer chloroform, methylene chloride and tetrachloroethane. Examples of solvents which are not suitable, because they tend to be brominated and are thus not inert, are unsaturated compounds, ether and acetonitrile.

By the expression "substantially" as applied to the non-polar organic solvents I mean that the non-polar organic solvent should be non-polar when considered in relation to the organic alcohol present in the non-polar organic solvent.

The inert, substantially non-polar solvents should contain from 0.5–10% weight/volume advantageously 1.0–3.0% weight/volume of the aliphatic alcohol, for example, ethanol. It will be appreciated that commercially available chloroform is normally stabilized with a small proportion of ethanol, and this commercial material may be used without the addition of further alcohol. The resulting hydrogen halide complex is then treated with bromine; where pure starting material is used substantially only the theoretical quantity of bromine is preferably added, whilst with impure starting material the use of a slight excess over the theoretical quantity is preferred.

The bromination step is preferably carried out in suspension. This not only leads to economy of solvent medium but also gives superior yields.

The product may, for example, be isolated by adding ether and recovering the solid precipitated, for example, by filtration. The product is a mixture of unchanged starting material and the desired 21-bromo-compound.

The reaction may be carried out at temperatures between 10° and 35° C., and is preferably carried out at room temperature.

The 21-bromo compounds obtained by the process according to the invention may be converted into the corresponding 21-esters, in particular the 21-acetates, in any convenient manner, for example by treatment of the bromo compound with the potassium salt of the appropriate acid, for example, potassium acetate, as described in Examples 2, 3, 4, 5 and 6 which follow.

In order that the invention may be well understood the following examples are given by way of illustration only:

*Example 1*

3β:17α-dihydroxy-5α-pregnan-11:20-dione (146 g.) is suspended in commercial chloroform (3 l.) containing hydrogen bromide (40 g.) and the mixture is stirred at room temperature for 10 minutes. With continued stirirng, a solution of bromine (75 g.) in commercial chloroform (750 ml.) is added at a steady rate at room temperature during 45 minutes. Ether (3 l.) is added with stirring, and the suspended solid is collected by filtration, washed with ether (0.5 l.) and air-dried. There is obtained in this way 155 g. of crude 21-bromo-3β:17α-dihydroxy-5α-pregnan-11:20-dione (containing some unchanged 3β:17α-dihydroxy-5α-pregnan-11:20-dione) suitable for conversion to the 21-acetoxy compound.

*Example 2*

3β:17α-dihydroxy-5α-pregnan-11:20-dione (500 g.) is suspended in chloroform (7.5 l.; 1.4% alcohol w./v.) containing hydrogen chloride (52.5 g.) and the mixture stirred at room temperature for 5 minutes. With continued vigorous stirring a solution of bromine (230 g.) in chloroform (2.5 l.) is added at such a rate that a slight excess of bromine is maintained in the suspension. Total time of addition 50 minutes. Ether (7.5 l.) is added with stirring, and the suspended solid is collected by filtration, washed with ether (2 l.) and air-dried. There is obtained in this way 628 g. of crude 21-bromo-3β:17α-dihydroxy-5α-pregnan-11:20-dione. A second crop is obtained by washing the combined mother liquors twice with water (5 l. each time) to remove hydrogen halides and evaporating to dryness in vacuo on the steam bath. The residue is leached with acetone (0.2 l.) and the residual solid filtered off to give 20 g. of 21-bromide after air drying.

The combined crops of bromo-compound (648 g.) are suspended in acetone (12.5 l.) with anhydrous potassium acetate (800 g.) and the mixture refluxed with mechanical stirring for 1 hour. The inorganic salts are filtered off and washed with acetone (1 l.). The combined filtrate and washings are concentrated by distillation on a steam bath to a volume of approximately 800 ml. Water (12.1) is added, and after thorough mixing, the suspension is filtered, the solid product being well washed with water and dried at 80° C. There is obtained in this manner 541 g. of crude 21-acetoxy-3β:17α-dihydroxy-5α-pregnan-11:20-dione, M. P. 229–232° (assay by infra-red 94%).

Crystallisation from methanol (5.5 l.) and drying the crystalline product in vacuo at 120° gives 411 g. of purified 21-acetate M. P. 232–235° (assay by infra-red 98%). The mother liquors are concentrated by distillation to about 1 l., acetic acid (50 ml.) and Girard reagent P (20 g.) are added and the solution refluxed for 30 minutes. The solution is allowed to crystallise at 0°, the crystalline solid is harvested, washed with methanol (100 ml.) and dried in vacuo at 120°, affording 66 g. of 21-acetate M. P. 233–235° (assay by infra-red 97%).

*Example 3*

3β:17α-dihydroxy-5α-pregnan-11:20-dione (10.g) is suspended in tetrachloroethane (150 ml.) and 5 N hydrogen chloride in ethanol (6.2 ml.) is added with stirring at room temperature. With continued vigorous stirring a solution of bromide in tetrachloroethane (40.2 ml. of 1.42 N) is added over a period of 17 minutes. The suspended solid is collected by filtration, washed with ether (100 ml.) and air-dried. There is obtained in this way 11.55 g. of crude 21-bromo-3β:17α-dihydroxy-5α-pregnan-11:20-dione. A second crop of 1.65 g. is obtained by washing the mother liquors with water, evaporating to dryness in vacuo and leaching with acetone. The combined crops of bromo-compound (13.2 g.) are converted to 21-acetoxy-3β:17α-dihydroxy-5α-pregnan-11:20-dione by treatment with anhydrous potassium acetate (15 g.) in refluxing acetone (200 ml.) for one hour. There is isolated 11.0 g. of crude 21-acetate M. P. 224–227° (assay by infra-red 96%). Purification by treatment with Girard reagent P affords 10.04 g. of purified 21-acetate M. P. 231–235° (assay by infra-red 98%).

*Example 4*

3β:17α-dihydroxy-5α-pregnan-11:20-dione (100 g.) is suspended in methylene chloride (1.4 l.) and 8.5 N hydrogen chloride in ethanol (37.6 ml.) is added with stirring at room temperature. With continued stirring a solution of bromine (15.4 ml.) in methylene chloride (500 ml.) is added over a period of 26 minutes. The solid is filtered off, washed with ether (500 ml.) and air-dried. There is obtained in this way 100.2 g. of crude 21 - bromo - 3β:17α - dihydroxy - 5α - pregnan - 11:20-dione. A second crop of 11.5 g. is obtained by combining the mother liquors and the ether wash, washing with water, evaporating to dryness in vacuo and leaching with acetone.

The combined crops of bromo-compound (111.7 g.) are converted to 21-acetoxy-3β:17α-dihydroxy-5α-pregnan-11:20-dione as described in Example 2. There is isolated 95.5 g. of crude 21-acetate (M. P. 220–224° C.). Purification by treatment with Girard reagent P affords 69.4 g. of purified 21-acetate M. P. 237–241° C. (assay by infra-red 98%).

*Example 5*

3β:17α-dihydroxy-5α-pregnane-11:20-dione (10 g.) is suspended in petroleum ether (150 ml. B. P. 80/100° previously washed with concentrated sulphuric acid followed by water, dried, distilled and then saturated with industrial methylated spirit). Hydrogen chloride gas is blown into the well stirred suspension until no more is absorbed. A solution of bromine in purified petroleum ether (46.5 ml. of 1.24 N) is added dropwise as fast as the bromine colour is discharged. The super-natant petrol is poured off from the resulting gum which is then triturated with acetone (50 ml.) and ether (50 ml.) to give a reddish solid. There is obtained in this manner 7.8 g. of crude 21-bromo-3β:17α-dihydroxy-5α-pregnane-11:20-dione.

By treatment with dry potassium acetate in refluxing acetone followed by isolation and purification the bromo compound may be converted into 3.4 g. of 21-acetoxy-3β:17α-dihydroxy-5α-pregnane-11:20-dione, M. P. 231–234° (assay by infra-red 98%).

*Example 6*

3β:17α-dihydroxy-5α-pregnane-11:20-dione (10 g.) is suspended in benzene (150 ml.) and 5 N hydrogen chloride in ethanol (6.2 ml.) added. The suspension is vigorously stirred and a solution of bromine in benzene (44.5 ml. of 1.29 N) is added dropwise as fast as the bromine colour is discharged. The suspended solid is collected, washed with a little ether and air-dried. There is thus obtained 11.2 g. of crude 21-bromo-3β:17α-dihydroxy-5α-pregnane-11:20-dione suitable for conversion to 21-acetoxy-3β:17α-dihydroxy-5α-pregnane-11:20 dione.

The bromo-compound 11.2 g. is refluxed in acetone (200 ml.) with dry potassium acetate (15 g.) for one hour. Inorganic salts are filtered off, washed with a little acetone and the combined acetone filtrates are concentrated in vacuo to —50 ml. Water (500 ml.) is added, the precipitated solid collected, washed with water and dried at 80°. There is obtained in this way 8.8 g. of crude 21 - acetoxy - 3β:17α - dihydroxy-5α-pregnane-11:20-dione M. P. 221–224° (assay by infra-red 90%).

Using a similar reaction technique to that adopted in the foregoing examples, 3β:17α-dihydroxy-5α-pregnane-11:20-dione was brominated in chloroform containing various primary and secondary alcohols. The results obtained are as follows:

| Example No. | Weight of Starting material, grams | Addition to chloroform (150 ml. used) | Remarks on Bromination | Yield of 21-bromo compound, grams | Yield of crude 21-Acetate | Yield of pure 21-Acetate |
|---|---|---|---|---|---|---|
| 7 | 10.0 | 2% ethanol | "Cut-off" in 25 mins. | 12.19 | 10.45 g | not obtained. |
| 8 | 10.0 | ____do____ | "Cut-off" in 20 mins. | 11.35 | 9.90 g | Do. |
| 9 | 10.0 | 0.4% ethanol | Complete uptake in 1 hour. | 12.42 | 10.62 g | Do. |
| 10 | 10.0 | 2% methanol | "Cut-off" in 20 mins. | 11.71 | 10.25 g | Do. |
| 11 | 10.0 | 2% n-propanol | "Cut-off" in 45 mins. | 11.81 | 10.10 g | Do. |
| 12 | 10.0 | 2% n-butanol | "Cut-off" in 1¼ hours. | 11.50 | 10.55 g | 6.78 g. |
| 13 | 10.0 | ____do____ | "Cut-off" in 15 mins. | 11.50 | 9.80 g | not obtained. |
| 14 | 10.0 | 2% n-amyl alcohol | "Cut-off" in 23 mins. | 10.31 | 9.0 g | Do. |
| 15 | 10.0 | 2% iso-amyl alcohol | "Cut-off" in 25 mins. | 11.48 | 9.7 g | Do. |
| 16 | 10.0 | 2% n-octanol | "Cut-off" in 22 mins. | 12.30 | 10.33 g | Do. |
| 17 | 10.0 | 2% iso-propyl alcohol | Complete uptake in 2½ hours. | 9.72 | 2.06 g.; 17-OH, 6.75 g | 3.88 g. |
| 18 | 10.0 | 2% sec-butanol | Complete uptake in 1½ hours. | 9.90 | 0.40 g.; 17-OH, 7.15 g | 4.23 g. |
| 19 | 10.0 | 2% cyclo-hexanol | Complete uptake in 1 hour. | 9.35 | 2.0 g.; 17-OH, 5.85 g | 3.42 g. |

This application is a continuation-in-part of copending application Serial No. 522,852, filed July 18, 1955, now abandoned.

I claim:

1. A process for the bromination in the 21-position of the $3\beta:17\alpha$-dihydroxy-11:20-diketo derivatives of pregnane and allo-pregnane consisting of reacting said diketo derivative with a hydrogen halide selected from the group consisting of hydrogen bromide and hydrogen chloride in the presence of a substantially non-polar organic solvent containing from 0.5 to 10% weight/volume of an alcohol selected from the group consisting of $C_1$–$C_8$ aliphatic primary alcohols and $C_1$–$C_8$ aliphatic secondary alcohols and brominating the resulting hydrogen halide complex.

2. The process of claim 1 in which said aliphatic primary alcohol is ethanol.

3. The process of claim 2 in which said substantially non-polar solvent contains from 1.0 to 3.0% weight/volume of ethanol.

4. The process of claim 2 in which said substantially non-polar solvent is a halogenated hydrocarbon.

5. The process of claim 2 in which said substantially non-polar solvent is an unsubstituted hydrocarbon.

6. The process of claim 2 in which the reaction is carried out at a temperature between 10° and 35° C.

7. The process of claim 2 in which the starting material is suspended in said substantially non-polar solvent.

8. A process for the bromination in the 21-position of $3\beta:17\alpha$-dihydroxy-$5\alpha$-pregnane-11:20-dione consisting of reacting said compound with a hydrogen halide selected from the group consisting of hydrogen bromide and hydrogen chloride in the presence of an organic solvent selected from the group consisting of chloroform, methylene dichloride and tetrachloroethane containing from 1.0 to 3.0% weight/volume of a $C_1$–$C_8$ primary alkanol and brominating the resulting hydrogen halide complex in suspension in said organic solvent at a temperature of 10–35° C.

References Cited in the file of this patent

UNITED STATES PATENTS 2,752,339     Julian et al. _____ June 26, 1956